US010945008B2

(12) United States Patent
Tang

(10) Patent No.: US 10,945,008 B2
(45) Date of Patent: Mar. 9, 2021

(54) SMART TERMINAL, INTERACTION METHOD BASED THEREON, INTERACTION SYSTEM, AND NON-TRANSITORY COMPUTER READABLE STORAGE MEDIUM

(71) Applicants: BOE TECHNOLOGY GROUP CO., LTD., Beijing (CN); K-TRONICS (SU ZHOU) TECHNOLOGY CO., LTD., Suzhou (CN)

(72) Inventor: Jinchao Tang, Beijing (CN)

(73) Assignees: BOE TECHNOLOGY GROUP CO., LTD., Beijing (CN); K-TRONICS (SU ZHOU) TECHNOLOGY CO., LTD., Suzhou (CN)

(*) Notice: Subject to any disclaimer, the term of this patent is extended or adjusted under 35 U.S.C. 154(b) by 248 days.

(21) Appl. No.: 16/134,897

(22) Filed: Sep. 18, 2018

(65) Prior Publication Data

US 2019/0281331 A1 Sep. 12, 2019

(30) Foreign Application Priority Data

Mar. 12, 2018 (CN) .......................... 201810201611.0

(51) Int. Cl.
*H04N 21/2387* (2011.01)
*H04W 4/80* (2018.01)
(Continued)

(52) U.S. Cl.
CPC ..... *H04N 21/2387* (2013.01); *H04N 21/4227* (2013.01); *H04N 21/44218* (2013.01); *H04W 4/80* (2018.02); *Y02P 90/02* (2015.11)

(58) Field of Classification Search
CPC .......... H04N 21/4227; H04N 21/2387; H04N 21/44218; A01K 1/00; H04W 4/80;
(Continued)

(56) References Cited

U.S. PATENT DOCUMENTS

2011/0162018 A1* 6/2011 Dodd ....................... H04N 7/18
2012/0060176 A1* 3/2012 Chai ....................... H04H 60/33
(Continued)

FOREIGN PATENT DOCUMENTS

CN 101021908 A 8/2007
CN 101261671 A 9/2008
(Continued)

OTHER PUBLICATIONS

First Chinese Office Action dated Jul. 16, 2020, for corresponding Chinese Application No. 201810201611.0.

*Primary Examiner* — Anthony Bantamoi
(74) *Attorney, Agent, or Firm* — Kinney & Lange, P.A.

(57) ABSTRACT

The present disclosure discloses a smart terminal, an interaction method based thereon, and an interaction system. The interaction method includes: transmitting trigger information to an associated device according to an acquired trigger instruction triggered by a movable object; receiving first information fed back by the associated device; playing back the first information to the movable object; and transmitting second information fed back by the movable object according to the first information to the associated device.

19 Claims, 7 Drawing Sheets

(51) Int. Cl.
*H04N 21/4227* (2011.01)
*H04N 21/442* (2011.01)

(58) Field of Classification Search
CPC ....... Y02P 90/02; G05B 15/02; G05B 19/418; G05B 2219/2642
See application file for complete search history.

(56) References Cited

U.S. PATENT DOCUMENTS

2013/0229399 A1* 9/2013 Yokota ................ G09G 5/00
2015/0186132 A1* 7/2015 Oliveri ................ G06F 8/70

FOREIGN PATENT DOCUMENTS

| CN | 102768514 A | 11/2012 |
|---|---|---|
| CN | 103268303 A | 8/2013 |
| CN | 103605995 A | 2/2014 |
| CN | 104122817 A | 10/2014 |
| CN | 20508736 U | 3/2016 |
| CN | 206135988 U | 4/2017 |
| JP | 2000326274 A | 11/2000 |

* cited by examiner

SMART TERMINAL, INTERACTION METHOD BASED THEREON, INTERACTION SYSTEM, AND NON-TRANSITORY COMPUTER READABLE STORAGE MEDIUM

CROSS-REFERENCE TO RELATED APPLICATION(S)

This application claims priority to Chinese Application No. 201810201611.0, entitled "SMART TERMINAL, INTERACTION METHOD BASED THEREON, INTERACTION SYSTEM, AND PROCESSOR" and filed on Mar. 12, 2018, which is incorporated herein by reference in its entirety.

TECHNICAL FIELD

The present disclosure relates to the field of smart control technology, and in particular, to a smart terminal, an interaction method based thereon, an interaction system, and a non-transitory computer readable storage medium.

BACKGROUND

With development of the Internet age, most homes and companies have installed wireless networks to facilitate access to the Internet anytime and anywhere at home or in the workplace. Many users often keep wireless routers in their home open for convenience of accessing the Internet at any time, that is, to keep a network-connected state at home.

When a pet is kept in the home and its owner is out, the owner can only monitor a situation at home through a camera in the home, but cannot interact with the pet at home. That is, a remote interaction between the pet and the owner cannot be realized currently.

SUMMARY

According to some embodiments of the present disclosure, a smart terminal based interaction method is provided. The interaction method includes: transmitting trigger information to an associated device according to an acquired trigger instruction triggered by a movable object; receiving first information fed back by the associated device; playing back the first information to the movable object; and transmitting, to the associated device, second information fed back by the movable object in response to the first information.

In some embodiments, the trigger instruction is acquired by: reading radio tag data on the movable object entering a preset area; determining identity information of the movable object based on the radio tag data; and acquiring the trigger instruction determined based on the identity information.

In some embodiments, the determining the identity information of the movable object based on the radio tag data includes: determining the identity information of the movable object by matching it with the radio tag data.

In some embodiments, the trigger instruction is a trigger instruction indicating that the movable object triggers the smart terminal.

In some embodiments, after the trigger information is transmitted to the associated device according to the acquired trigger instruction triggered by the movable object, the method further includes: receiving interaction instruction information fed back by the associated device, and starting a display apparatus according to the interaction instruction information; and the playing back the first information to the movable object includes: playing back the first information to the movable object by the display apparatus.

In some embodiments, the starting the display apparatus according to the interaction instruction information includes: parsing the interaction instruction information by means of an SDK package; and starting the display apparatus according to the parsed interaction instruction information.

In some embodiments, after the interaction instruction information fed back by the associated device is received, the method further includes: parsing the interaction instruction information to acquire an operation instruction in the parsed interaction instruction information; and controlling, according to the operation instruction, an external device communicatively connected to the smart terminal to be started.

In some embodiments, the external device includes a device that interacts with the movable object, and the controlling, according to the operation instruction, the external device communicatively connected to the smart terminal to be started includes: starting, according to the operation instruction, the device communicatively connected to the smart terminal and interacting with the movable object to perform an interaction operation.

In some embodiments, after the first information is played back to the movable object, the method further includes: detecting and judging whether the radio tag data on the movable object is read in a preset period; in response to the radio tag data being not read within the preset period, turning off the display apparatus and controlling the smart terminal to enter a standby state; in response to the radio tag data being read, determining the identity information of the movable object based on the radio tag data and transmitting the identity information of the movable object to the associated device.

In some embodiments, after the interaction instruction information fed back by the associated user is received, the method further includes: parsing the interaction instruction information to acquire a video playback instruction in the parsed interaction instruction information; and starting, according to the video playback instruction, a video playback apparatus to play back a corresponding video.

According to some embodiments of the present disclosure, a smart terminal is provided. The smart terminal includes: a processor; a memory storing instructions which, when executed by the processor, cause the processor to: transmit trigger information to an associated device according to an acquired trigger instruction triggered by a movable object; receive first information fed back by the associated device; play back the first information to the movable object; and transmit, to the associated device, second information fed back by the movable object in response to the first information.

In some embodiments, the smart terminal further includes: a display apparatus, a camera apparatus, and a radio reader, wherein the display apparatus, the camera apparatus, and the radio reader are communicatively connected to the processor, respectively; the camera apparatus is configured to acquire video information of the movable object, and output the video information as content included in the second information to the processor; the display apparatus is configured to receive and play back the first information output by the processor; and the radio reader is configured to read radio tag data on the movable object entering a preset area, so that the processor acquires the trigger instruction triggered by the movable object according to the radio tag data.

In some embodiments, the radio reader is an RFID reader.

In some embodiments, the smart terminal further includes: a microphone configured to acquire audio information of the movable object, and output the audio information as content included in the second information to the processor.

In some embodiments, the smart terminal further includes: a button configured to provide a trigger operation to the movable object.

In some embodiments, the smart terminal further includes: a wireless communication apparatus configured to start, according to an operation instruction output by the processor, a device via wireless communication to perform an interaction operation, the device interacting with the movable object.

In some embodiments, the smart terminal further includes: a video playback apparatus, configured to receive a video playback instruction which is output by the processor according to the parsed interaction instruction information, and play back a corresponding video according to the video playback instruction.

According to some other embodiments of the present disclosure, a smart system is provided. The smart system includes the smart terminal according to any of the above embodiments, and further includes a user terminal configured to perform information interaction with the smart terminal, wherein the user terminal is configured to feedback the interaction instruction information to the smart terminal according to the trigger information transmitted by the smart terminal, in order to control the smart terminal to perform the interaction operation.

In some embodiments, the interaction system further includes a cloud server, wherein the user terminal is communicatively connected to the smart terminal via the cloud server.

According to some other embodiments of the present disclosure, a non-transitory computer readable storage medium storing instructions is provided. The instructions, when executed by a processor, cause the processor to perform the method according to any of the above embodiments.

BRIEF DESCRIPTION OF THE DRAWINGS

In order to more clearly illustrate the technical solutions in the embodiments of the present disclosure, the drawings which are used in the description of the embodiments of the present disclosure will be briefly described below. It is obvious that the drawings in the following description are only some embodiments of the present disclosure. For the skilled in the art, other drawings may be obtained according to the contents of the embodiments of the present disclosure and the drawings without any creative effects.

DETAILED DESCRIPTION

In order to further clarify the technical problem solved by the present disclosure, the technical solutions used in the present disclosure, and the technical effects achieved by the present disclosure, will be further described in detail below with reference to example embodiments and the accompanying drawings. It is obvious that the described embodiments are only a part of embodiments of the present disclosure, rather than all of the embodiments thereof. All other embodiments obtained by the skilled in the art based on the embodiments of the present disclosure without creative efforts are within the scope of the present disclosure.

The following abbreviations are used herein:
RFID: Radio Frequency Identification.
APP: Application.

The movable object described in the embodiments of the present disclosure may be a pet in the home, such as a dog, a cat, or the like. However, the movable object described in the present disclosure is not limited to a pet in the home.

The present disclosure proposes an interaction method based on a smart terminal, which provides an interactive platform for a pet and its owner to solve the problem of difficulty in interacting with the pet at home when the user is not at home. The interaction method based on the smart terminal may be applied to the exemplary application environment as described in FIG. 1

Figure 1:
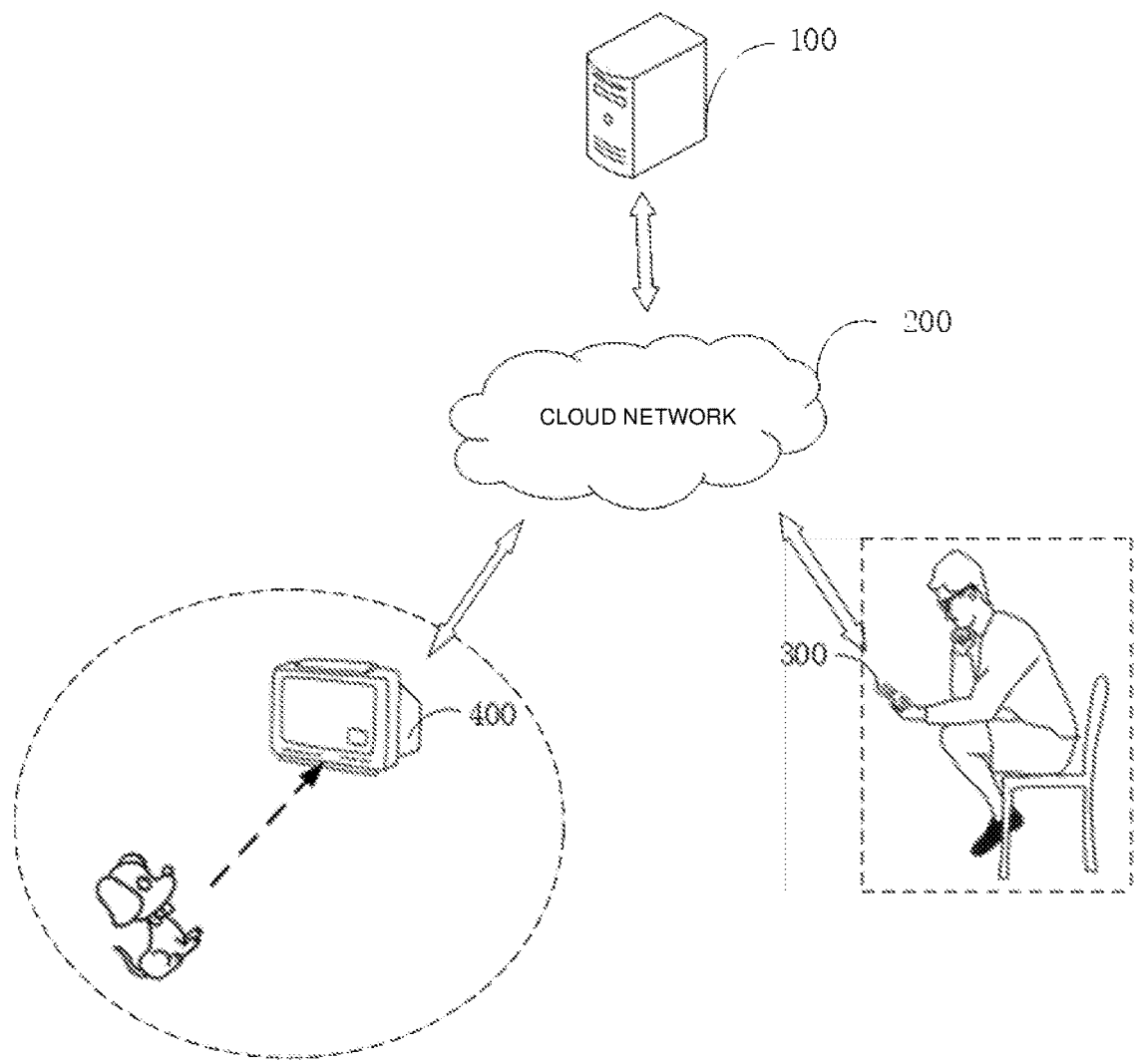
FIG. 1 is a block diagram of an exemplary application scenario of an interaction method based on a smart terminal in an embodiment provided by the present disclosure.

As shown in FIG. 1, a server 100, a terminal 300 of an associated user, and a terminal 400 where a movable object is positioned are located in an environment of the same cloud network 200. The server 100, the terminal 300 of the associated user and the terminal 400 where the movable object is positioned perform interactions of data information through the cloud network 200. The numbers of the server 100, the terminal 300 of the associated user, and the terminal 400 where the movable object is positioned are not limited, and FIG. 1 is only illustrated as an example. An APP is installed in the terminal 300 of the associated user. The associated user can perform information interaction with the corresponding server 100 through the APP in his terminal 300. The movable object may also perform the information interaction with the corresponding server through the APP on the terminal 400 where it is positioned. The associated user implements interaction of data information with the movable object through the server 100. However, the present disclosure is not limited thereto. In other embodiments, the terminal 300 of the associated user may also communicate directly with the terminal 400 where the movable object is positioned through the cloud network 200 without intervention of the server 100.

The server 100 may be, but is not limited to, a web server, a management server, an application server, a database server, a cloud server, and the like. The terminal 300 may be, but not limited to, a smart phone, a personal computer (PC), a tablet computer, a personal digital assistant (PDA), a mobile internet device (MID), and the like. An operating system of the terminal 300 may be, but not limited to, an Android system, an IOS (iPhone operating system) system, a Windows phone system, a Windows system, and the like. The terminal 400 may be, but is not limited to, a smart home device (e.g., a smart TV), a desktop computer, a laptop, and the like.

Figure 2:
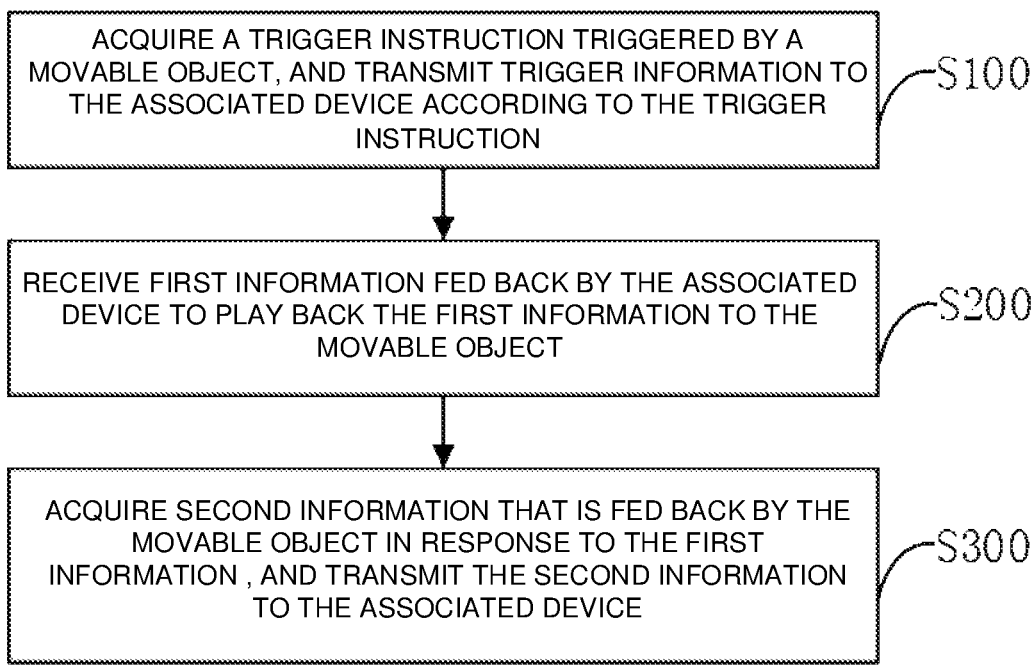
FIG. 2 is a flowchart of an exemplary method of an interaction method based on a smart terminal in an embodiment provided by the present disclosure.

In an embodiment, as shown in FIG. 2, the interaction method based on a smart terminal provided by some embodiments of the present disclosure includes step S100.

In step S100, a trigger instruction triggered by a movable object is acquired, and trigger information is transmitted to the associated device according to the trigger instruction.

The smart terminal acquires the trigger instruction triggered by the movable object, and transmits the trigger information to the associated device where an associated user is positioned according to the trigger instruction. The associated device may be a smart terminal used by the associated user. In the present embodiment, the smart terminal transmits the trigger information to the cloud network server, and the server transmits the trigger information down to a terminal APP of the corresponding associated user, so that the associated user may obtain the trigger information of the smart terminal where the movable object is positioned. The movable object may be a pet at home, and the associated user may be a pet owner at the remote end. The trigger information may be trigger information for reminding the associated user to perform remote interactions, or may be trigger information including identity information of the movable object.

Figure 3:
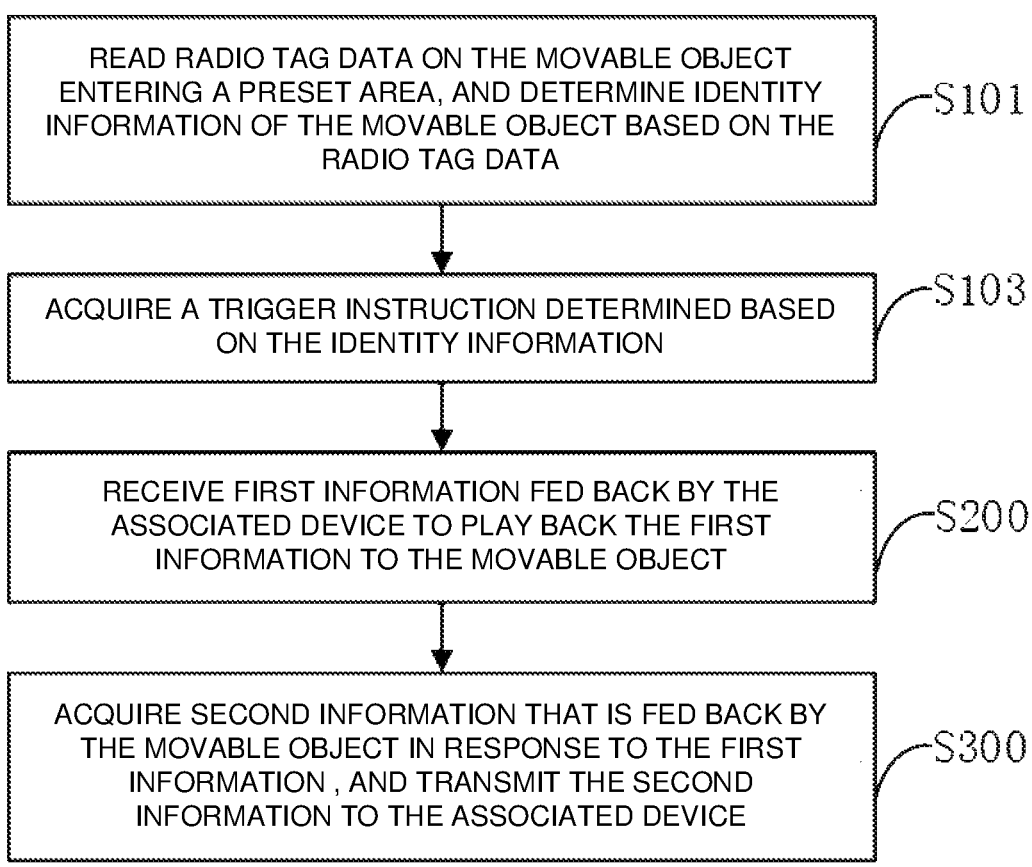
FIG. 3 is a flowchart of an exemplary method of an interaction method based on a smart terminal in another embodiment provided by the present disclosure.

In an embodiment, as shown in FIG. 3, step S100 may include steps S101 and S103.

In step S101, radio tag data on the movable object entering a preset area is read, and identity information of the movable object is determined based on the radio tag data.

In step S103, a trigger instruction determined based on the identity information is acquired.

In the present embodiment, the movable object carries a radio tag. The smart terminal determines the identity information of the movable object by reading the data of the radio tag on the movable object, forms the trigger instruction according to the identity information, and transmits the trigger information to the associated user of the remote end according to the trigger instruction. Therefore, the trigger information contains the identity information of the movable object, and the associated user may know the identity of the movable object when receiving the trigger information. The identity information of the movable object is determined by the smart terminal identifying the radio tag data on the movable object and matching the radio tag data with the identity information of the movable object from a memory in which the identity information is stored. The radio tag may be an RFID tag, and the smart terminal transmits the RFID tag on the movable object through an RFID reader to identify the identity information of the movable object on the RFID tag. In other embodiments, the radio tag may also be a radio tag other than the RFID tag. In order to identify the tag data on the corresponding radio tag, the smart terminal reads the tag data on the movable object through a radio reader corresponding to the radio tag.

Meanwhile, the smart terminal can read the radio tag data on the movable object only when the movable object enters the preset area. For example, when the movable object enters a range of less than or equal to 1.5 m from the smart terminal, the smart terminal reads the radio tag data on the movable object to acquire the trigger instruction.

Therefore, in the present embodiment, only when the movable object enters the preset area, the interaction between the movable object and the associated user is started, thereby avoiding a high power consumption caused by the terminal where the movable object is positioned in a startup state for a long time, and reducing the power consumption of the terminal. In addition, the associated user may also know the identity information of the movable object through the trigger information of the terminal, thereby improving effective interactions between the movable object and the associated user.

Figure 4:
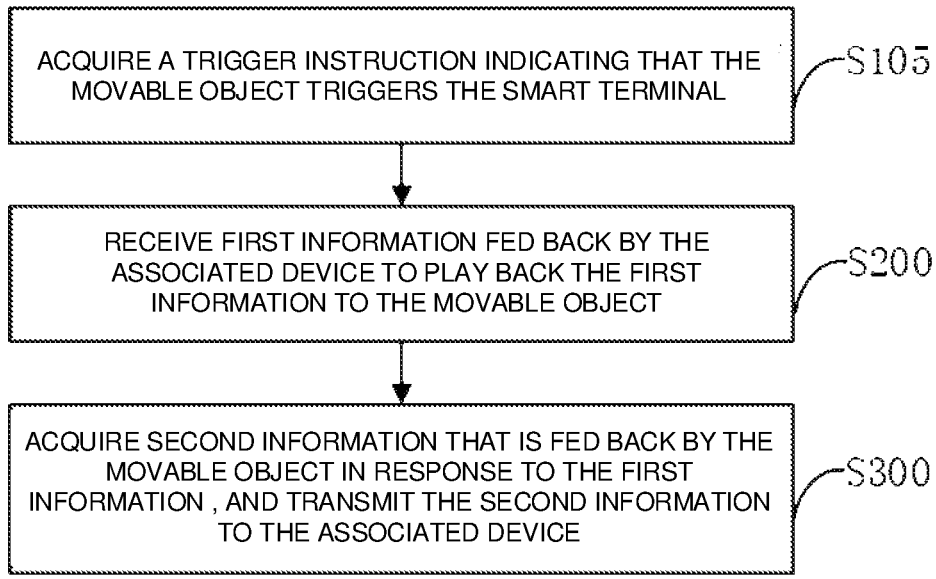
FIG. 4 is a flowchart of an exemplary method of an interaction method based on a smart terminal in another embodiment provided by the present disclosure.

In another embodiment, as shown in FIG. 4, step S100 may include step S105.

In step S105, a trigger instruction that triggers the smart terminal by the movable object is acquired.

In the present embodiment, the smart terminal acquires the trigger instruction by the movable object triggering the smart terminal. For example, when the movable object presses a corresponding button on the smart terminal, the smart terminal acquires a trigger instruction, and transmits trigger information to the associated user according to the trigger instruction. The corresponding button on the smart terminal may be physical hardware disposed on a surface of the smart terminal, or may be a virtual button disposed on an interface of the smart terminal. The present embodiment provides a way for the movable object to actively apply for a remote interaction with the associated user, thereby enhancing the experience of the movable object interacting with the associated user.

In addition, the methods as shown in FIGS. 2, 3 and 4 may further include step S200.

In step S200, first information fed back by the associated device is received to play back the first information to the movable object.

In the present embodiment, after receiving the trigger information transmitted by the smart terminal where the movable object is positioned, the associated device may feed the first information back to the smart terminal. The first information may be video information and/or audio information. After receiving the first information fed back by the associated device, the smart terminal plays back the first information to the movable object. Specifically, the smart terminal may play back the first information to the movable object by a display apparatus.

In an embodiment, after starting the display apparatus, the smart terminal receives video information fed back by the associated user, and plays back the video information which is fed back by the associated user through the display apparatus to the movable object. In the present embodiment, the video information fed back by the associated user is personal interaction video information that the associated user interacts with the movable object and is captured in real time by the associated user using the user terminal.

In an embodiment, the smart terminal may also receive audio information fed back by the associated user, and play back the audio information by the audio playback apparatus. In another embodiment, the smart terminal simultaneously plays back the video information and the audio information fed back by the associated user through the display apparatus and the audio playback apparatus, or the audio and video playback apparatus, so that the movable object may acquire the audio and video information of the remotely associated user by the smart terminal to interact with the remotely associated user.

In addition, the methods as shown in FIGS. 2, 3 and 4 may further include step S300.

In step S300, second information that is fed back by the movable object in response to the first information is acquired, and the second information is transmitted to the associated device.

While the smart terminal receives and plays back the first information fed back by the associated device to the movable object, it acquires the second information fed back by the movable object in response to the first information that is fed back by the associated device, and transmits the second information to the associated device. The associated user acquires the second information of the movable object by the associated device, thereby implementing information interaction between the movable object and the associated user. The second information may be video and/or audio information.

In a particular embodiment, the video information of the movable object is acquired by a camera apparatus, and the video information of the movable object is transmitted to the associated user via a wireless network of the smart terminal. In the present embodiment, the camera apparatus captures the video information of the movable object in real time, and transmits the real-time video information to the associated user. At the same time, the smart terminal may also acquire, via a sound apparatus, audio information that the movable object feeds back to the associated user according to the audio information fed back by the associated user, and transmits the real-time audio information to the associated user. The camera apparatus may be a camera of the smart terminal, and the sound apparatus may be a microphone of the smart terminal. As such, the smart terminal transmits real-time audio information and/or video information of the movable object to the associated user, and the associated user feeds back real-time audio information and/or video information of the associated user to the terminal where the movable object is positioned via the cloud network, thereby implementing the interaction of the video and/or audio of the associated user and the movable object, further improving the user experience of the remote interaction between the associated user and the movable object. According to the interaction method provided by the disclosure, the terminal where the movable object is positioned may transmit the trigger information to the associated device where the associated user is positioned according to the trigger instruction triggered by the movable object, and the associated user may feed the first information back to the terminal where the movable object is positioned by the associated device according to the trigger information, so that the terminal may play back the first information to the movable object. At the same time, the terminal where the movable object is positioned transmits the second information fed back by the movable object to the associated user. Therefore, with the interaction method as described above, the information of the outgoing owner may be played back by the smart terminal in the home to the pet in the home, and meanwhile the information of the pet in the home may be fed back to the outgoing owner by the smart terminal, thereby realizing the remote interaction between the user and the pet in the home.

Figure 5:
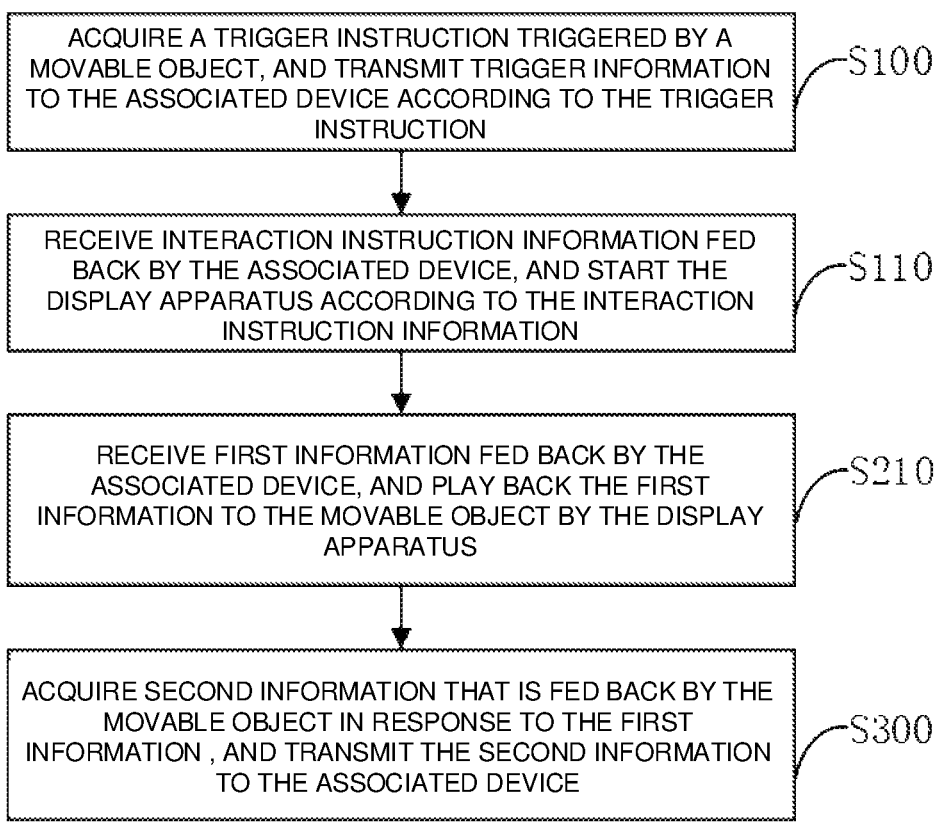
FIG. 5 is a flowchart of an exemplary method of an interaction method based on a smart terminal in another embodiment provided by the present disclosure.

In an embodiment, as shown in FIG. 5, after step S100, the method may further include step S110.

In step S110, interaction instruction information fed back by the associated device is received, and the display apparatus is started according to the interaction instruction information.

Step S200 includes step S210 of playing back the first information to the movable object by the display apparatus.

In the present embodiment, after the smart terminal transmits the trigger information to the associated device where the remotely associated user is positioned, the associated user transmits the feedback interaction instruction information to the smart terminal via the cloud network according to the trigger information. After receiving the interaction instruction information, the smart terminal starts the display apparatus of the smart terminal. Specifically, the smart terminal parses the interaction instruction information fed back by the associated user by means of an integrated software development kit (SDK) package, and then starts the display apparatus according to the parsed interaction instruction information. At the same time, the smart terminal plays back the first information to the movable object by the display apparatus.

In an embodiment, after step S110, that is, after the smart terminal receives the interaction instruction information fed back by the associated user, the method further includes: parsing the interaction instruction information, and acquiring an operation instruction in the parsed interaction instruction information; and controlling an external device communicatively connected to the smart terminal to be started according to the operation instruction. The external device includes a device that interacts with the movable object; and the controlling the external device communicatively connected to the smart terminal to be started includes: starting, according to the operation instruction, the device communicatively connected to the smart terminal and interacting with the movable object to perform an interaction operation.

Specifically, the smart terminal parses the received interaction instruction information transmitted by the associated user, obtains the operation instruction in the parsed interaction instruction information, and controls the external device connected to the smart terminal to start work according to the operation instruction. Here, the external device communicatively connected to the smart terminal may be a device that interacts with the movable object. The device that interacts with the movable object may communicate with the smart terminal through Bluetooth technology. The smart terminal controls the device associated with the movable object to perform the work of interacting with the movable object according to the operation instruction in the interaction instruction information transmitted by the associated user. For example, when the movable object is a pet, and the device associated with the movable object is the pet's feeder, the operation instruction in the interaction instruction information transmitted by the associated user is feeding the pet by the feeder. At this time, the smart terminal controls the feeder to perform the corresponding feeding operation according to the operation instruction. Alternatively, the device associated with the movable object is a toy of the pet. The smart terminal controls the toy of the pet to play a playful interaction with the pet according to the operation instruction.

In the present embodiment, the associated user may control, by the smart terminal where the movable object is positioned, the device which is communicatively connected to the smart terminal and associated with the movable object to start the work of interaction with the movable object, so that the associated user may control the interaction between the device in the environment where the movable object is positioned and the movable object, thereby enhancing the interaction between the movable object and the associated user.

Figure 6:
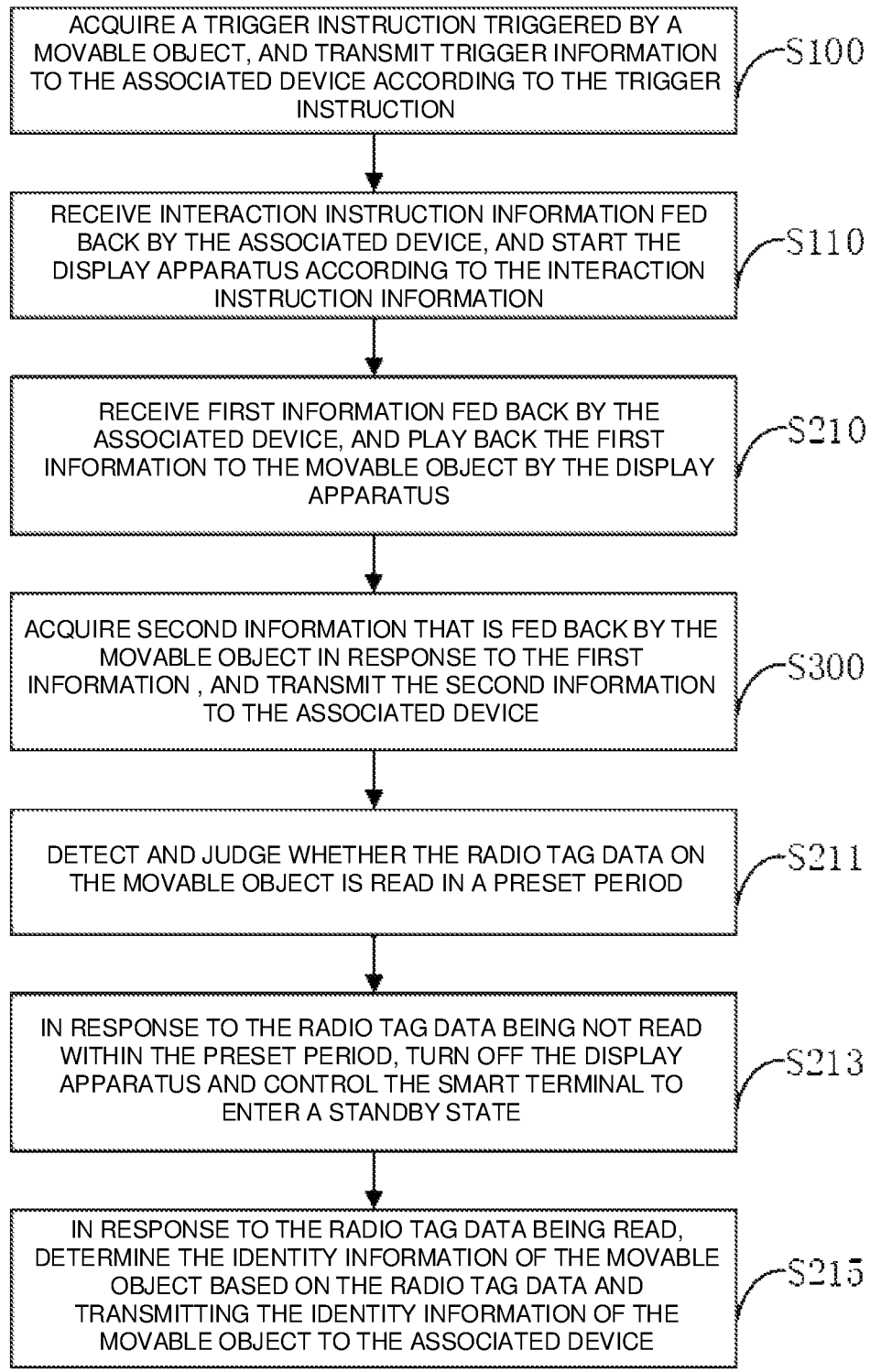
FIG. 6 is a flowchart of an exemplary method of an interaction method based on a smart terminal in another embodiment provided by the present disclosure.

In an embodiment, as shown in FIG. 6, after step S210, the method may further include:

step S211 of detecting and judging whether the radio tag data on the movable object is read in a preset period;

step S213 of, in response to the radio tag data being not read within the preset period, turning off the display apparatus and controlling the smart terminal to enter a standby state;

step S215 of, in response to the radio tag data being read, determining the identity information of the movable object based on the radio tag data and transmitting the identity information of the movable object to the associated device.

In the present embodiment, after the smart terminal plays back the first information fed back by the associated user to the movable object, it detects and judges whether the radio tag data on the movable object is read in the preset period. For example, the smart terminal detects whether there is a wireless signal input on the movable object every 4 minutes or 6 minutes. If the smart terminal does not read the radio tag data within the preset period, for example, within 10 minutes, the display apparatus that plays back the first information is turned off, and the smart terminal is controlled to enter a standby state. Otherwise, the smart terminal determines the identity information of the movable object based on the radio tag, and transmits the identity information to the associated device where the associated user is positioned. Therefore, in the present embodiment, when the smart terminal does not read the radio tag data on the movable object within the preset period, it indicates that the movable object is far away from the smart terminal, and the associated user at the remote end does not need to interact with the movable object, and at this time, the display apparatus is turned off and the smart terminal is controlled to enter the standby state, thereby reducing the power consumption of the smart terminal.

In an embodiment, after step S110 of "receiving the interaction instruction information fed back by the associated user", the method further includes: parsing the interaction instruction information to acquire a video playback instruction in the parsed interaction instruction information; and starting, according to the video playback instruction, a video playback apparatus to play back a corresponding video.

In the present embodiment, the interaction instruction information that the associated user feeds back to the smart terminal where the movable object is positioned includes the video playback instruction that controls the video playback apparatus of the smart terminal to play back the video. The smart terminal may parse the received interaction instruction information fed back by the associated user by means of the integrated SDK package, and obtain the video playback instruction in the interaction instruction information. The video playback apparatus is started according to the video playback instruction to play back the corresponding video. For example, the movable object is a pet dog, and the smart terminal may start the video playback apparatus to play back the pet dog-related video according to the video playback instruction.

In order to describe the interaction method based on the smart terminal of the present disclosure in more detail, a particular embodiment of the interaction method based on the smart terminal is provided below.

Figure 7:
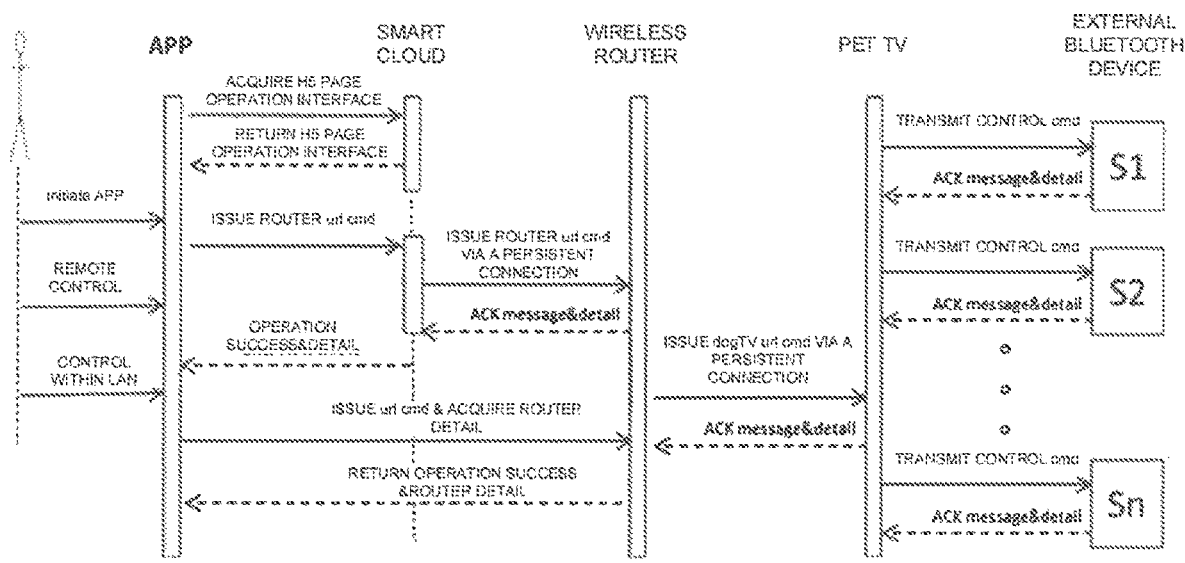
FIG. 7 is a schematic diagram of an exemplary network communication manner of an interaction method based on a smart terminal in an embodiment provided by the present disclosure.

In the present embodiment, the smart terminal is a home smart TV, and the movable object is a pet (such as a pet dog) in the home. The network communication environment of the interaction method based on the smart terminal is as shown in FIG. 7. First, the relevant SDK package is integrated on the TV end. After the TV end establishes a long connection to the smart cloud by means of the SDK package, the user transmits an instruction of operating a wireless router by using the APP on the mobile terminal, the smart cloud transmits the instruction to the TV end, an APP on the TV end parses the instruction by means of the integrated SDK, and provides to the APP on the TV end for processing.

A table below is a parameter table of a remote control instruction by means of the APP on the mobile terminal, wherein a switch on/off is an instruction for the TV end. When the switch is off, the TV end enters a low-power-consumption standby mode (at this time, it may receive a command (cmd) transmitted from the smart cloud, the screen and backlight are closed, and a mainboard is running); and when the switch is on, the TV end enters a normal function state, and the user and the pet may interact with each other normally.

TV Standard Parameter Table

| Parameter Name | stream_id | Module Received Value | Description of Module Received Value | Character Type | Parameter Unit | Controllability | Note |
|---|---|---|---|---|---|---|---|
| Switch | jpw | off | Turned off | string | None | Y | |
| | | on | Turned on | | | | |
| State Display | jst | up | Up | string | None | Y | |
| | | do | Down | | | | |
| | | lef | Left | | | | |
| | | rig | Right | | | | |
| | | ent | Enter | | | | |
| | | vup | Vol. up | | | | |
| | | vdo | Vol. down | | | | |
| | | men | Menu | | | | |
| | | hom | Home Page | | | | |

-continued

TV Standard Parameter Table

| Parameter Name | stream_id | Module Received Value | Description of Module Received Value | Character Type | Parameter Unit | Controllability | Note |
|---|---|---|---|---|---|---|---|
| | | bac | Backspace | | | | |
| Video Clip Licensee Channel ID | jur jcid | | | | | | Channel id |

Figure 8:
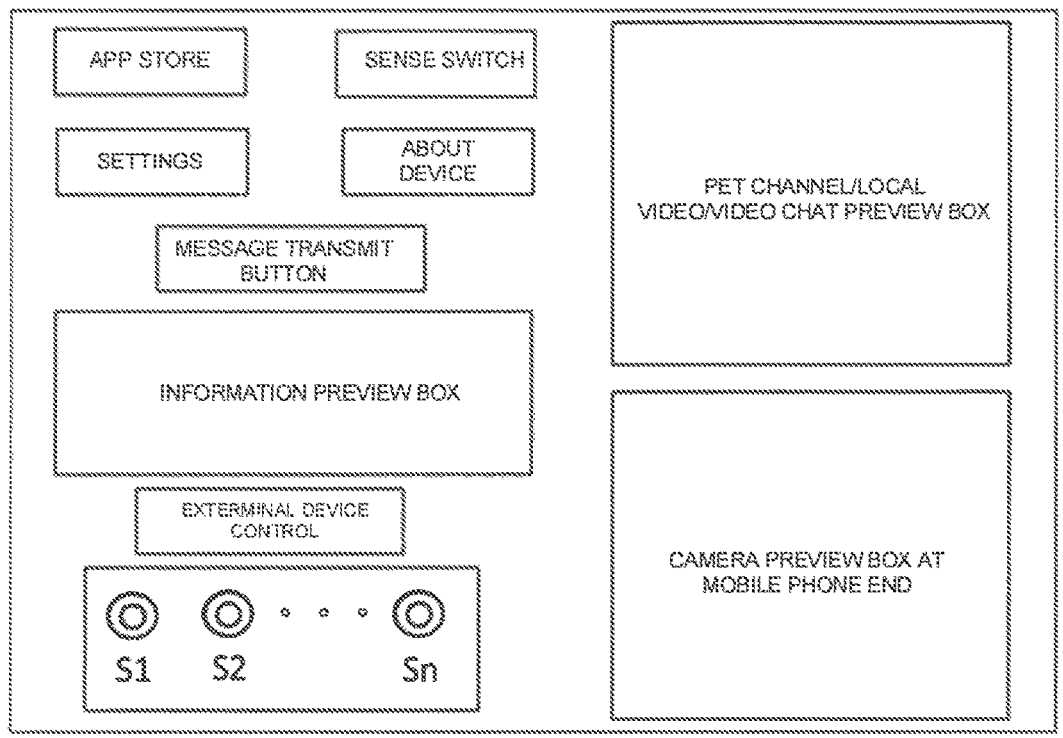
FIG. 8 is a schematic diagram of an exemplary operation interface at a user end in an interaction method based on a smart terminal in an embodiment provided by the present disclosure.

Then, a designed HTML5 control interface is uploaded to the smart cloud, and the mobile device at the user end downloads the HTML5 control interface from the smart cloud to generate a device control page in the APP on the mobile device, so as to let the user to achieve the function of controlling the device remotely or in the same local area network. The control interface is as shown in FIG. 8.

The user may complete the control of the TV end and implement various state monitoring and function switching through the control interface. By reading a radio tag, such as an RFID tag, carried by the pet itself, the identity information of the pet is obtained, and the trigger information carrying the identity information is transmitted to the user. The principle of the RFID technology for the pet identity identification is in that after the radio tag carried by the pet itself is entered to the magnetic field, it receives an RF signal emitted from the reader, and sends product information (a passive tag) stored in a chip by an energy obtained by an induced current, and the smart terminal reads information in the tag through the radio reader. In order to effectively save the power consumption, a size of the identification card may be set smaller, and the TV end judges whether the pet is within a range of 1.5 m or less from the TV end through the RFID reader. When the pet enters the range, the TV end will be automatically turned on to enter the normal operation mode, and transmits a message to notify the owner that he may obtain the state of the pet or interact with the pet by the video. When the pet is out of range, the TV end will enter the power saving mode to turn off the screen. The TV end will also periodically access the RFID reader. When the RFID signal input is not detected for a long time (a preset duration may be set), the TV end will automatically enter the standby state, and a real-time monitoring function will be automatically enabled after the TV end enters the standby state, until the pet enters the area, the TV end will be automatically turned on to transmit a message to the mobile device end of the user.

In addition, in order to let the pet actively communicate with the owner, a button is reserved at the TV end, and the pet may directly transmit a message to the owner at the remote end by the button. After the owner receives the message, he may turn on the camera and interact with the pet. At the same time, the owner may also control the TV end by the mobile device (such as a mobile phone), play back a local/pet TV program to the pet, and control an external Bluetooth device (e.g. a feeder, a collar, an animal toy, an air conditioner, a pet drinking fountains, etc.) through the TV end. S1, S2, . . . , Sn in FIG. 8 represent external Bluetooth devices. Functions, such as feeding the pet, interaction with the pet, etc., may be implemented by the device, and care and interaction with the pet when the owner is out of home may be achieved.

Figure 9:
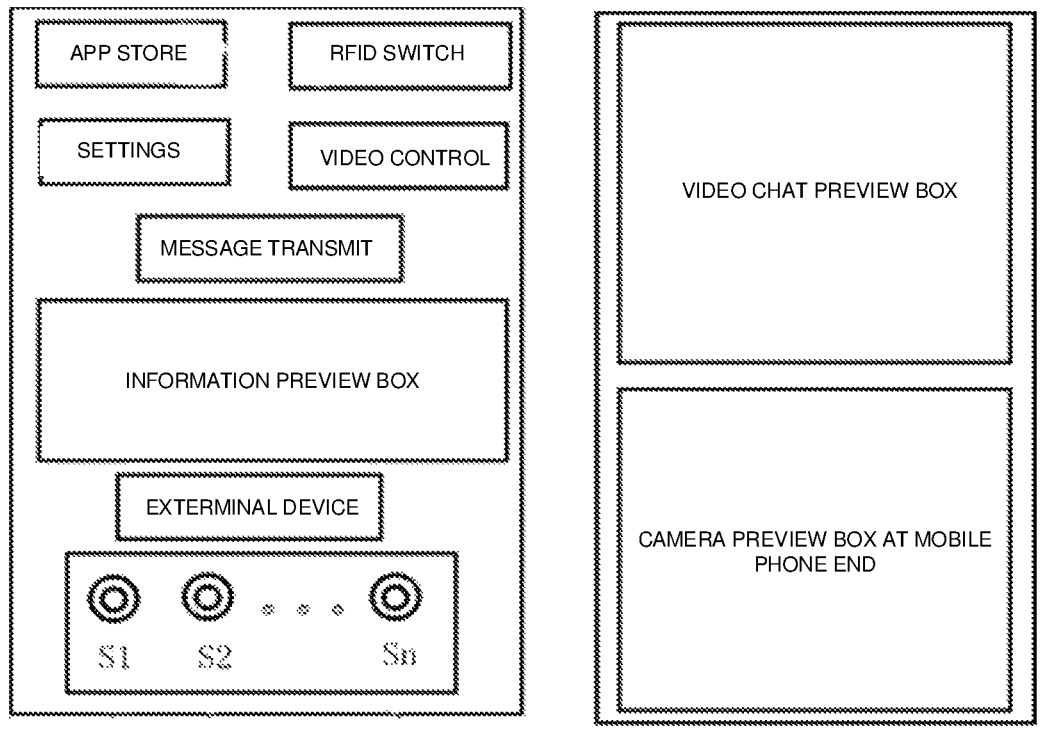
FIG. 9 is a schematic diagram of an exemplary operation interface of a smart terminal in an interaction method based on a smart terminal in an embodiment provided by the present disclosure.

A specific implementation is as shown in FIG. 7. First, the user opens the App, the App will acquire a control interface from the smart cloud, and generate an operation interface as shown in FIG. 8. Further, the user may perform corresponding operations on the generated operation interface, such as the operations on the TV end. The operation interface in FIG. 9 corresponds to the interface of the TV end, and operations may be operated by a remote controller, and the corresponding operations may also be remotely controlled by the mobile device end of the user. The operations on the mobile device end of the user as shown in FIG. 7 will be directly mapped to the TV end to complete the operations on the TV end.

In addition, the user may bring different e-tags to respective pets in the home, and store the corresponding e-tags in the TV end of the pet. When the pet is close to the TV end, the RFID reader on the TV end may read the data in the e-tag, identify a pet type of the pet, and transmits the pet type to the mobile device of the user, so that the user may control the corresponding information. The user may also set an automatic mode, in which when the pet is close, the TV end of the pet may identify the pet type based on the read information, and then play back a favorite channel program of the corresponding pet.

The following functions may be achieved by the above methods.

Figure 10:
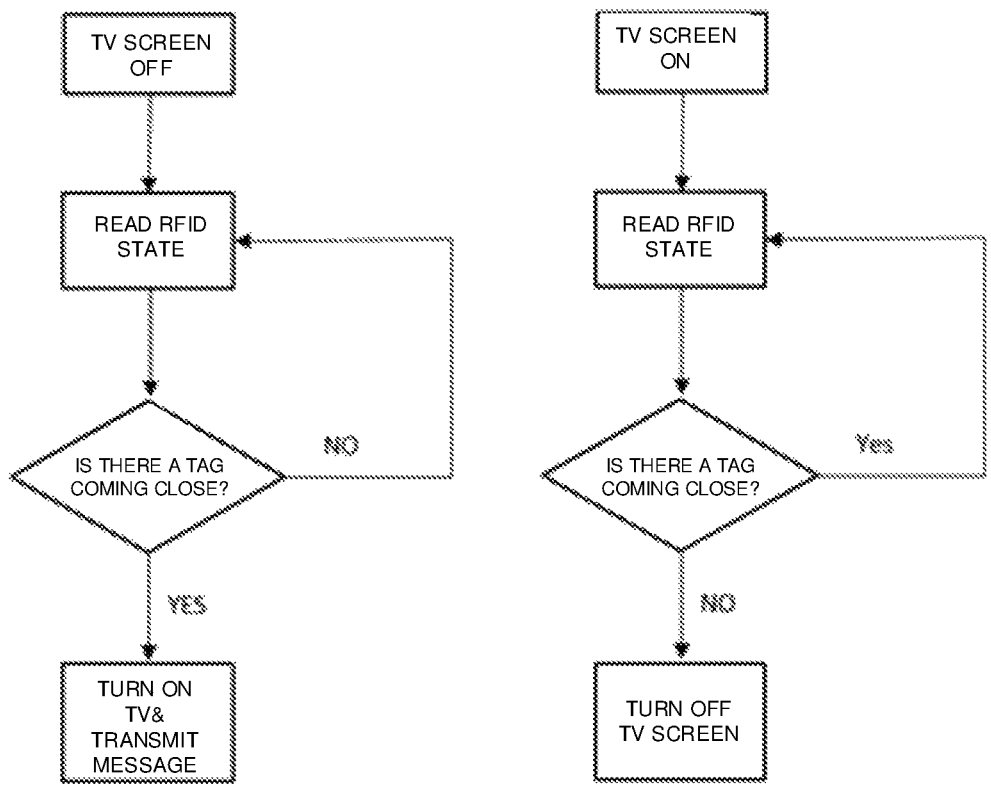
FIG. 10 is a schematic flowchart diagram of a smart terminal controlling an operation state of a TV by identifying an RFID state in an interaction method based on a smart terminal according to an embodiment of the present disclosure.

1. As shown in FIG. 10, by reading the state of the RFID tag, the TV end is controlled to enter the standby state (turning off the screen) or the normal operation state (turning on the screen), thereby saving energy.

2. By identifying the pet type by the radio tag (RFID tag), the pet type is filled into a corresponding radio tag card on the TV end of the pet. When a pet is coming close, data in the database is searched, corresponding pet information is transmitted to the owner, and the favorite program of the corresponding pet is automatically played back according to the pet type.

3. By transmitting the message with the button and the RFID technology, several kinds of messages may be preset in the APP, the pet may transmit this message to the owner by pressing the button, and when the RFID reader is triggered, a message may be transmitted to the owner to notify that the interaction with the pet may be performed at this time.

4. By controlling the surrounding Bluetooth devices through the TV end, the operations of feeding the pet with foods, water, etc. may be implemented when the owner is out of home.

5. Interactions between the owner and the pet are implemented by the camera.

The above operations are done through the smart cloud. Controlling the TV, playing back the pet channel programs/ local video content, and video interactions may be implemented by means of the smart cloud.

Figure 11:
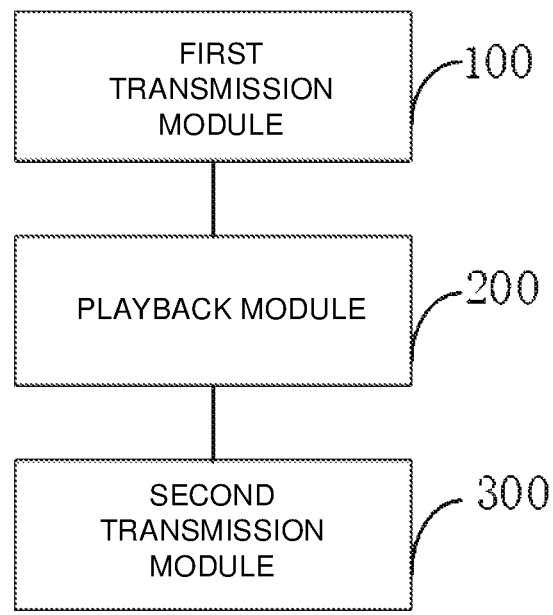
FIG. 11 is a structural block diagram of a smart terminal in an embodiment provided by the present disclosure.

The present disclosure also provides a smart terminal. As shown in FIG. 11, the smart terminal may include a first transmission module 100, a playback module 200, and a second transmission module 300.

The first transmission module 100 is configured to acquire a trigger instruction triggered by the movable object, and transmit trigger information to the associated device according to the trigger instruction. The smart terminal acquires the trigger instruction triggered by the movable object, and transmits the trigger information to the associated device where the associated user is positioned according to the trigger instruction. The associated device may be a smart terminal used by the associated user. In the present embodiment, the smart terminal transmits the trigger information to the cloud network server, and the server transmits the trigger information down to a terminal APP of the corresponding associated user, so that the associated user may obtain the trigger information of the smart terminal where the movable object is positioned. The movable object may be a pet at home, and the associated user may be a pet owner at the remote end. The trigger information may be trigger information for reminding the associated user to perform remote interactions, or may be trigger information including identity information of the movable object.

The playback module 200 is configured to receive first information fed back by the associated device, and play back the first information to the movable object. In the present embodiment, after receiving the trigger information transmitted by the smart terminal where the movable object is positioned, the associated device feeds the first information back to the smart terminal. The first information may be video information and/or audio information. After receiving the first information fed back by the associated device, the smart terminal plays back the first information to the movable object. Specifically, the smart terminal may play back the first information to the movable object by a display apparatus.

After starting the display apparatus, the smart terminal receives video information fed back by the associated user, and plays back the video information which is fed back by the associated user through the display apparatus to the movable object. In the present embodiment, the video information fed back by the associated user is personal interaction video information that the associated user interacts with the movable object and is captured in real time by the associated user using the user terminal.

In an embodiment, the smart terminal may also receive audio information fed back by the associated user, and play back the audio information by the audio playback apparatus. That is, the smart terminal simultaneously plays back the video information and the audio information fed back by the associated user through the display apparatus, so that the movable object may acquire the audio and video information of the remotely associated user by the smart terminal to interact with the remotely associated user.

The second transmission module 300 is configured to acquire second information that is fed back by the movable object in response to the first information, and transmit the second information to the associated user device. While the smart terminal receives and plays back the first information fed back by the associated device to the movable object, it acquires the second information fed back by the movable object in response to the first information that is fed back by the associated device, and transmits the second information to the associated device. The associated user acquires the second information of the movable object by the associated device, thereby implementing information interaction between the movable object and the associated user. The second information may be video and/or audio information.

In a particular embodiment, the video information of the movable object is acquired by a camera apparatus, and the video information of the movable object is transmitted to the associated user via a wireless network of the smart terminal. In the present embodiment, the camera apparatus captures the video information of the movable object in real time, and transmits the real-time video information to the associated user. At the same time, the smart terminal may also acquire, via a sound apparatus, audio information that the movable object feeds back to the associated user according to the audio information fed back by the associated user, and transmits the real-time audio information to the associated user. The camera apparatus may be a camera of the smart terminal, and the sound apparatus may be a microphone of the smart terminal. As such, the smart terminal transmits real-time audio information and/or video information of the movable object to the associated user, and the associated user feeds back real-time audio information and/or video information of the associated user to the terminal where the movable object is positioned via the cloud network, thereby implementing the interaction of the video and/or audio of the associated user and the movable object, further improving the user experience of the remote interaction between the associated user and the movable object.

In other embodiments, the various modules in the smart terminal provided by the present disclosure are also used to perform operations which are performed in corresponding steps in the interaction method based on the smart terminal of the present disclosure, and will not be described in detail herein.

Figure 12:
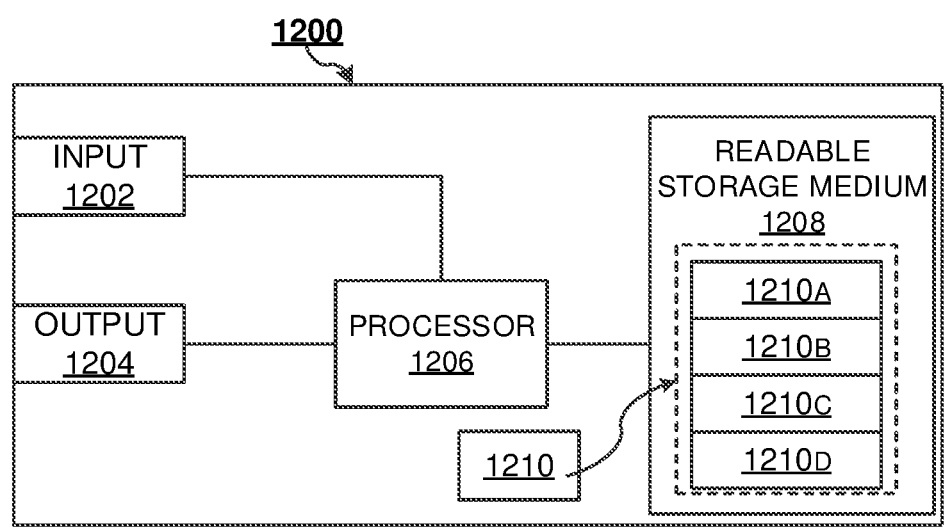
FIG. 12 is a block diagram showing an exemplary hardware structure of a smart terminal in an embodiment provided by the present disclosure.

FIG. 12 is a block diagram showing an exemplary hardware structure of a smart terminal 1200 in an embodiment provided by the present disclosure. The smart terminal 1200 may include a processor 1206 (e.g., a digital signal processor (DSP), a central processing unit (CPU), etc.). The processor 1206 may be a single processing unit or a plurality of processing units for performing different actions of the processes as described herein. The smart terminal 1200 may also include an input unit 1202 for receiving signals from other entities and an output unit 1204 for providing signals to other entities. The input unit 1202 and the output unit 1204 may be arranged as a single entity or as separate entities.

Moreover, the smart terminal 1200 may include at least one non-transitory readable storage medium 1208 in a form of a non-volatile or volatile memory, such as an electrically erasable programmable read only memory (EEPROM), a flash memory, and/or a hard disk driver. The non-transitory readable storage medium 1208 includes a computer program 1210 that includes code/computer readable instructions which, when executed by the processor 1206 in the smart terminal 1200, enable the smart terminal 1200 to perform, for example, processes and any variations thereof in conjunction with FIGS. 2-7 as described above.

Computer program 1210 may be configured as computer program codes in an architecture of e.g. computer program modules 1210A-1210D. Accordingly, in some embodiments, the codes in the computer program of the smart terminal 1200 may include a module 1210A for transmitting trigger information to the associated device according to an acquired trigger instruction triggered by the movable object. In addition, the codes in the computer program of the smart terminal 1200 may further include: a module 1210B for receiving first information fed back by the associated device. Further, the codes in the computer program of the smart terminal 1200 may further include: a module 1210C for playing back the first information to the movable object. In addition, the codes in the computer program of the smart terminal 1200 may further include: a module 1210D for transmitting, to the associated device, second information that the movable object feeds back in response to the first information.

The computer program modules may essentially perform various actions in the processes as illustrated in FIGS. 2-7 to simulate different modules. In other words, when different computer program modules are executed in the processor 1206, they may correspond to different modules in e.g. FIG. 11.

Although the code means in the embodiment disclosed above in connection with FIG. 12 is implemented as computer program modules that, when executed in the processor 1206, cause the smart terminal 1200 to perform the actions as described above in connection with FIGS. 2-7, in an alternative implementation, at least one of the code means may be implemented at least partially as a hardware circuit.

The processor may be a single CPU (Central Processing Unit), but may also include two or more processing units. For example, the processor may include a general purpose microprocessor, an instruction set processor, and/or a related chipset and/or a special purpose microprocessor (e.g., an application-specific integrated circuit (ASIC)). The processor may also include an onboard memory for caching purposes. The computer program may be carried by a computer program product connected to the processor. The computer program product may include a computer readable medium having stored thereon a computer program. For example, the computer program product can be a flash memory, a random access memory (RAM), a read only memory (ROM), an EEPROM, and the computer program modules as described above may be distributed in a form of memory within the smart terminal to different computer program products in alternative embodiments.

In an embodiment, the present disclosure further provides a processor, configured to perform the interaction method based on the smart terminal as described in any of the above embodiments. The processor may be a multi-core processor or a processor set containing multiple processors. In some particular implementations, the processor may include a general purpose main processor and one or more special coprocessors, such as a graphics processing unit (GPU), a digital signal processor (DSP), and the like. The processor may also be implemented using a custom circuit, such as an Application Specific Integrated Circuit (ASIC) or Field Programmable Gate Array (FPGA).

The present disclosure also provides a smart terminal. The smart terminal includes the processor, the radio reader, the camera apparatus, the microphone, the button, the wireless communication apparatus, and the video playback apparatus as described in the above embodiments. The radio reader, the camera apparatus, the microphone, the button, the wireless communication apparatus, and the video playback apparatus are each communicatively connected to the processor.

For example, the camera apparatus may be a camera.

The radio reader is configured to read radio tag data on the movable object which enters the preset area, and output the radio tag data to the processor. After receiving the radio tag data, the processor searches for identity information of the corresponding movable object, and transmits the identity information to the associated user. The radio reader may be an RFID reader, and the movable object carries an RFID tag which stores information that may identify the identity of the movable object. The RFID tag data on the movable object may be read by the RFID reader, and the processor matches it with the identity information of the movable object in the memory. Here, the movable object may be a pet in the home, e.g., a pet dog, a pet cat, and other crawling pets. The pet identity information stored in the RFID tag may be information of the pet type or the identity information of different codes of the same type of pet.

The camera apparatus is configured to acquire the video information of the movable object, and output the video information to the processor. The microphone is used to acquire the audio information of the movable object, and output the audio information to the processor. The video and voice information of the moving object, such as the pet in the home, may be recorded by the camera and the microphone, and transmitted to the processor for processing and transmitting to the remote user, so that the remote user may monitor the pet in the home and interact with the pet in the home.

The button is used to transmit the trigger instruction to the processor upon receiving the trigger operation of the movable object. The processor transmits the trigger message to the remote user upon receiving the trigger instruction. When receiving the trigger information, the user may feed the interaction instruction information back to the smart terminal to interact with the movable object. Here, the button may be a physical button disposed on the outer surface of the smart terminal, or may be a virtual button disposed on the display screen of the smart terminal. The button may be a single button or multiple buttons. In an embodiment, if the number of buttons is one, any movable object transmits the trigger information for interaction to the remote user by triggering the button. In an embodiment, if the number of the buttons is multiple, it may be set that different movable objects correspond to different buttons. Different buttons transmit different trigger instructions to the processor, so the processor, after receiving different trigger instructions, transmits different trigger information to the remote user. The remote user may identify the identity information of different movable objects according to the different trigger information. The smart terminal transmits an interaction request to the remote user by the movable object triggering the button, which provides a way for the movable object to actively request the interaction, thereby improving the interactive experience between the movable object and the user.

The wireless communication apparatus is configured to control, by wireless communication, the device associated with the movable object to start the interaction with the movable object according to the operation instruction output by the processor. Specifically, after receiving the instruction transmitted by the remote user of controlling the device that is wirelessly connected to the smart terminal to start work, the processor outputs the corresponding operation instruction to the wireless communication apparatus, and the wireless communication apparatus controls the corresponding device to start the work of interaction with the movable object through the wireless communication technology. For example, the movable object is a pet dog, and the device wirelessly connected to the smart terminal is a feeder or a toy of a pet dog. The remote user may transmit a feeding instruction to the smart terminal, then the processor outputs an instruction of controlling the feeder to feed the pet dog, and controls the feeder to feed the pet dog by the wireless communication apparatus. Alternatively, the remote user may transmit an interaction instruction to the smart terminal, and the processor outputs an instruction of controlling the toy of the pet dog to perform an interactive operation, and controls the toy of the pet dog to interact with the pet dog through the wireless communication apparatus. In an embodiment, the wireless communication apparatus is a Bluetooth communication module. The Bluetooth communication module controls the device associated with the movable object to start the work of interaction with the movable object through the Bluetooth technology.

The video playback apparatus is configured to receive the video playback instruction output by the processor according to the parsed interaction instruction information, and play back the corresponding video according to the video playback instruction. In an embodiment, the smart terminal is a smart TV. The remote user may transmit a video playback instruction to the smart TV. After receiving the video playback instruction, the processor in the smart TV controls the video playback apparatus of the smart TV to play back the video of the corresponding channel. For example, after the remote user identifies the identity of the movable object, such as the identity of the pet dog, an instruction of playing back the TV channel of the pet dog may be transmitted to the smart TV. The video playback apparatus in the smart TV is controlled by the processor to play back the program of the corresponding channel. In other embodiments, the processor may automatically control the video playback apparatus to play back the corresponding video after the identity information of the movable object is identified by the camera. Alternatively, the processor may automatically control the video playback apparatus to play back the corresponding video after the movable object triggers the smart terminal to acquire the identity information of the movable object.

In an embodiment, the present disclosure also provides an interaction system. The interactive system includes the smart terminal as described in any of the above embodiments, and an electronic device for controlling the operation of the smart terminal. When the electronic device receives the trigger information transmitted by the smart terminal, the electronic device feeds the interaction instruction information back to the smart terminal according to the trigger information, so as to control the smart terminal to start the corresponding interaction work. Further, the interaction system further includes a cloud server, and the electronic device is communicatively connected to the smart terminal through the cloud server to implement the interaction of the data information.

Reference may be made to FIG. 1 for details. The cloud server is the server 100, the electronic device is the terminal 300, and the smart terminal is the terminal 400. The cloud server, the electronic device and the smart terminal exchange data information via the cloud network 200. The user may interact with the cloud server through the APP of the electronic device. The cloud server controls the smart terminal to perform corresponding operations according to the data information uploaded by the electronic device. Moreover, the cloud server further receives the data information uploaded by the smart terminal, and feeds the data information back to the electronic device of the user end, thereby implementing the interaction between the electronic device at the user end and the smart terminal at the movable object end, thereby further achieving the interaction between the movable object and the user.

The above content is only a part of the embodiments of the present disclosure, and the particular embodiments and the scope of application may be made by the skilled in the art may according to the idea of the present disclosure. The content of the present specification should not be construed as limitation of the present disclosure.

I claim:

1. A smart terminal based interaction method for performing remote interactions between a movable object and a user, comprising:

transmitting trigger information to an associated device being in a proximity of the user and operated by the user according to an acquired trigger instruction triggered by the movable object;

receiving first information fed back by the associated device;

playing back the first information to the movable object; and transmitting, to the associated device, second information fed back by the movable object in response to the first information, wherein after the trigger information is transmitted to the associated device according to the acquired trigger instruction triggered by the movable object, the method further comprises:

receiving interaction instruction information fed back by the associated device, and starting a display apparatus according to the interaction instruction information; and wherein the playing back the first information to the movable object comprises:

playing back the first information to the movable object by the display apparatus.

2. The method of claim 1, wherein the trigger instruction is acquired by:

reading radio tag data on the movable object entering a preset area;

determining identity information of the movable object based on the radio tag data; and acquiring the trigger instruction determined based on the identity information.

3. The method of claim 2, wherein determining the identity information of the movable object based on the radio tag data comprises:

determining the identity information of the movable object by matching it with the radio tag data.

4. The method of claim 1, wherein the trigger instruction is a trigger instruction indicating that the movable object triggers the smart terminal.

5. The method of claim 1, wherein the starting the display apparatus according to the interaction instruction information comprises:

parsing the interaction instruction information by means of a software development kit (SDK) package; and starting the display apparatus according to the parsed interaction instruction information.

6. The method of claim 1, wherein after the interaction instruction information fed back by the associated device is received, the method further comprises:

parsing the interaction instruction information to acquire an operation instruction in the parsed interaction instruction information; and controlling, according to the operation instruction, an external device communicatively connected to the smart terminal to be started.

7. The method of claim 6, wherein the external device comprises a device that interacts with the movable object, and controlling, according to the operation instruction, the external device communicatively connected to the smart terminal to be started comprises:

starting, according to the operation instruction, the device communicatively connected to the smart terminal and interacting with the movable object to perform an interaction operation.

8. The method of claim 1, wherein after the first information is played back to the movable object, the method further comprises:
   detecting and judging whether the radio tag data on the movable object is read in a preset period;
   in response to the radio tag data being not read within the preset period, turning off the display apparatus and controlling the smart terminal to enter a standby state; and
   in response to the radio tag data being read within the preset period, determining the identity information of the movable object based on the radio tag data and transmitting the identity information of the movable object to the associated device.

9. The method of claim 1, wherein after the interaction instruction information fed back by the associated user is received, the method further comprises:
   parsing the interaction instruction information to acquire a video playback instruction in the parsed interaction instruction information; and
   starting, according to the video playback instruction, a video playback apparatus to play back a corresponding video.

10. A smart terminal for performing remote interactions with a user, comprising:
    a processor; and
    a memory storing instructions which, when executed by the processor, cause the processor to:
       transmit trigger information to an associated device being in a proximity of the user and operated by the user according to an acquired trigger instruction triggered by a movable object;
       receive first information fed back by the associated device;
       play back the first information to the movable object; and
       transmit, to the associated device, second information fed back by the movable object in response to the first information,
    wherein the instructions, when executed by the processor, further cause the processor to:
       after the trigger information is transmitted to the associated device according to the acquired trigger instruction triggered by the movable object, receive interaction instruction information fed back by the associated device, and start a display apparatus according to the interaction instruction information; and
    wherein the play back of the first information to the movable object comprises:
       playing back the first information to the movable object by the display apparatus.

11. The smart terminal of claim 10, further comprising a display apparatus, a camera apparatus, and a radio reader, wherein:
    the display apparatus, the camera apparatus, and the radio reader are communicatively connected to the processor, respectively;
    the camera apparatus is configured to acquire video information of the movable object, and output the video information as content included in the second information to the processor;
    the display apparatus is configured to receive and play back the first information output by the processor; and
    the radio reader is configured to read radio tag data on the movable object entering a preset area, so that the processor acquires the trigger instruction triggered by the movable object according to the radio tag data.

12. The smart terminal of claim 11, wherein the radio reader is an RFID reader.

13. The smart terminal of claim 10, further comprising: a microphone configured to acquire audio information of the movable object, and output the audio information as content included in the second information to the processor.

14. The smart terminal of claim 10, further comprising: a button configured to provide a trigger operation to the movable object.

15. The smart terminal of claim 10, further comprising: a wireless communication apparatus configured to start, according to an operation instruction output by the processor, a device via wireless communication to perform an interaction operation, the device interacting with the movable object.

16. The smart terminal of claim 10, further comprising: a video playback apparatus configured to receive a video playback instruction which is output by the processor according to the parsed interaction instruction information, and play back a corresponding video according to the video playback instruction.

17. An interaction system, comprising the smart terminal according to claim 10, and further comprising a user terminal configured to perform information interaction with the smart terminal, wherein the user terminal is configured to feed back the interaction instruction information to the smart terminal according to the trigger information transmitted by the smart terminal, in order to control the smart terminal to perform the interaction operation.

18. The interaction system of claim 17, further comprising a cloud server, wherein the user terminal is communicatively connected to the smart terminal via the cloud server.

19. A non-transitory computer readable storage medium storing instructions which, when executed by a processor, cause the processor to perform the method according to claim 1.

* * * * *